(12) United States Patent
Isobe et al.

(10) Patent No.: US 6,194,058 B1
(45) Date of Patent: Feb. 27, 2001

(54) MULTI-LAYER MAGNETIC RECORDING MEDIUM, METHOD AND SYSTEM OF MANUFACTURE

(75) Inventors: Ryosuke Isobe; Guy M. Tadlock, both of Auburn; Brian McQuay, Opelika, all of AL (US)

(73) Assignee: Quantegy, Inc., Opelika, AL (US)

(*) Notice: Subject to any disclaimer, the term of this patent is extended or adjusted under 35 U.S.C. 154(b) by 0 days.

(21) Appl. No.: 09/126,929

(22) Filed: Jul. 31, 1998

(51) Int. Cl.$^7$ ................................................. G11B 5/716
(52) U.S. Cl. .......................... 428/216; 428/328; 428/329; 428/694 BM; 428/900
(58) Field of Search ........................... 428/216, 328, 428/329, 694 BM, 900

(56) References Cited

U.S. PATENT DOCUMENTS

| | | | |
|---|---|---|---|
| 3,977,985 | 8/1976 | Umeki et al. | 252/62.55 |
| 4,091,158 | 5/1978 | Kasuga et al. | 428/216 |
| 4,101,311 | 7/1978 | Aonuma et al. | 75/0.5 |
| 4,259,392 | 3/1981 | Suzuki | 428/212 |
| 4,364,988 | 12/1982 | Andoh et al. | 428/212 |
| 4,409,281 | 10/1983 | Kitamoto et al. | 428/212 |
| 4,500,599 | 2/1985 | Ogawa et al. | 428/336 |
| 4,511,617 | 4/1985 | Hideyama et al. | 428/212 |
| 4,550,062 | 10/1985 | Takayama et al. | 428/611 |
| 4,603,091 | 7/1986 | Mukasa et al. | 428/611 |
| 4,618,536 | 10/1986 | Morioka et al. | 428/329 |
| 4,619,868 | 10/1986 | Okita et al. | 428/425.1 |
| 4,621,018 | 11/1986 | Yoda et al. | 428/329 |
| 4,624,894 | 11/1986 | Kishimoto | 428/328 |
| 4,636,433 | 1/1987 | Kubo et al. | 428/328 |
| 4,636,448 | 1/1987 | Morita et al. | 428/607 |
| 4,659,633 | 4/1987 | Yamaguchi et al. | 428/695 |
| 4,746,542 | 5/1988 | Chino et al. | 427/131 |
| 4,844,946 | 7/1989 | Komatsu et al. | 427/48 |
| 4,863,793 | 9/1989 | Ogawa et al. | 428/323 |
| 4,874,633 | 10/1989 | Komatsu et al. | 427/48 |
| 4,982,302 | 1/1991 | Kitamoto et al. | 360/134 |
| 5,035,948 | 7/1991 | Saito et al. | 428/329 |
| 5,043,210 | 8/1991 | Yamakawa et al. | 428/323 |
| 5,089,317 | 2/1992 | Noguchi et al. | 428/212 |
| 5,188,907 | 2/1993 | Kawahara et al. | 428/694 |
| 5,258,223 | 11/1993 | Inaba et al. | 428/323 |
| 5,268,206 | 12/1993 | Komatsu et al. | 427/548 |
| 5,324,571 | 6/1994 | Koyama et al. | 428/212 |
| 5,370,932 | 12/1994 | Inaba et al. | 428/323 |
| 5,445,104 | 8/1995 | Moody | 114/316 |
| 5,489,466 | 2/1996 | Inaba et al. | 428/212 |
| 5,496,607 | 3/1996 | Inaba et al. | 428/653 |
| 5,496,622 | 3/1996 | Isobe et al. | 428/216 |
| 5,518,804 | 5/1996 | Mizuno et al. | 428/212 |
| 5,527,603 | 6/1996 | Isobe et al. | 428/323 |
| 5,637,390 | 6/1997 | Isobe et al. | 428/323 |
| 5,645,917 | 7/1997 | Ejiri et al. | 428/141 |
| 5,670,245 | 9/1997 | Isobe et al. | 428/216 |
| 5,705,268 | 1/1998 | Ishikawa et al. | 428/336 |
| 5,712,028 | 1/1998 | Seki et al. | 428/216 |

Primary Examiner—Stevan A. Resan
(74) Attorney, Agent, or Firm—Needle & Rosenberg, P.C.

(57) ABSTRACT

A multi-layer magnetic recording medium and a method for making a multi-layered magnetic recording media as described. The recording medium has magnetic inner layer with magnetic particles having a specific squareness ratio and saturation magnetization which results in superior high frequency output and improved overwrite characteristics. The method for making a magnetic recording medium involves controlled, partial drying of the inner layers to avoid intermixing of the respective layers while facilitating efficient fabrication.

24 Claims, 7 Drawing Sheets

MULTI-LAYER MAGNETIC RECORDING MEDIUM, METHOD AND SYSTEM OF MANUFACTURE

FIELD OF THE INVENTION

The present invention relates to multi-layered magnetic recording media and to a method for preparing multi-layered magnetic recording media.

BACKGROUND OF THE INVENTION

In recent years magnetic recording has become the preferred method of storing information such as sound, video images, and computer data. Magnetic tapes and disks are the most common types of recording media. The trend in magnetic recording is towards higher radio frequency outputs at higher frequencies and larger storage capacities. To achieve these objectives, two approaches have been taken: (1) increasing magnetic power by increasing coercive force and remanent magnetic flux, and (2) decreasing self demagnetization by decreasing magnetic layer thickness and optimizing orientation of the magnetic particles.

Individually, each approach appears insufficient to achieve higher radio frequency outputs and larger storage capacities, however, when used in combination, performance is improved significantly to the level of metal evaporative tape.

However, it has been difficult to form thin layer particulate media using conventional coating methods. To deal with this problem, thin layer particulate recording media coated in combination with a nonmagnetic lower-layer have been manufactured using simultaneous wet-on-wet double coating techniques. Such techniques make it possible to get high density particulate media which performs equivalent to metal evaporated tape.

A conventional nonmagnetic lower layer in a multi-layer recording medium is not capable of magnetic recording, but it may supply a smooth bonding surface for the adjacent upper layer and contribute to durability. The use of a nonmagnetic lower layer, however, can result in poor overwrite characteristics. Typical "hard" magnetic lower layers, on the other hand, containing predominantly particles such as acicular Co—$\gamma$—$Fe_2O_3$, $\gamma$—$Fe_2O_3$, $CrO_2$, $Fe_3O_4$, and Co—$Fe_3O_4$, have high squareness ratios and remanent flux densities. Magnetic media made using such particles in both layers sometimes exhibit unacceptably high levels of demagnetization.

Accordingly, there is a need for an improved multi-layer magnetic medium which exhibits enhanced high frequency output without signal erasure and overwrite problems.

Additionally, there is a need for an improved method for making multi-layer recording media that permits efficient application of successive, multiple layers to a substrate without experiencing significant intermixing of the layers that may be encountered using conventional wet-on-wet techniques.

SUMMARY OF THE INVENTION

The present invention is directed to an improved multi-layer recording medium having enhanced output at higher frequencies and improved overwrite performance. The present invention is further directed to an improved method for making multi-layer magnetic recording media which controls the surface characteristics of the respective layers and substantially eliminates intermixing of the successive layers as they are applied.

Additional features and advantages of the invention will be set forth in the description which follows, and in part will be apparent from the description, or may be learned by practice of the invention. The objectives and other advantages of the invention will be realized and attained by the article of manufacture and method particularly pointed out in the written description and claims hereof as well as the appended drawings.

To achieve these and other advantages and in accordance with the purpose of the invention, as embodied and broadly described, the present invention is directed to an improved multi-layer magnetic recording medium comprising a substrate, at least one magnetic inner layer and a magnetic outer layer. In one further aspect of the invention, the magnetic recording medium of the invention is a magnetic recording tape. In another aspect, the multi-layer recording medium of the invention has a magnetic inner layer with a squareness ratio and saturation magnetization (defined by a saturation magnetic flux density (Bm)×thickness of magnetic inner layer) within specific ranges; and the magnetic outer layer of the medium may contain oriented ferromagnetic particles.

The present invention, further, is directed to an improved method for making multi-layer magnetic recording media comprising the steps of applying a plurality of layers, in successive applications, to a nonmagnetic substrate, in which, subsequent to each application, a controlled degree of drying is applied to achieve a partial evaporation of solvent to permit application of the next successive layer while avoiding intermixing with the preceding, applied layer. In a further aspect, at least the last applied layer contains magnetic particles and one or more magnetic layers are subject to magnetic orientation following controlled drying.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE INVENTION

Reference will now be made in detail to the present preferred embodiments of the invention; examples of which are illustrated in the accompanying drawings.

Figure 1:
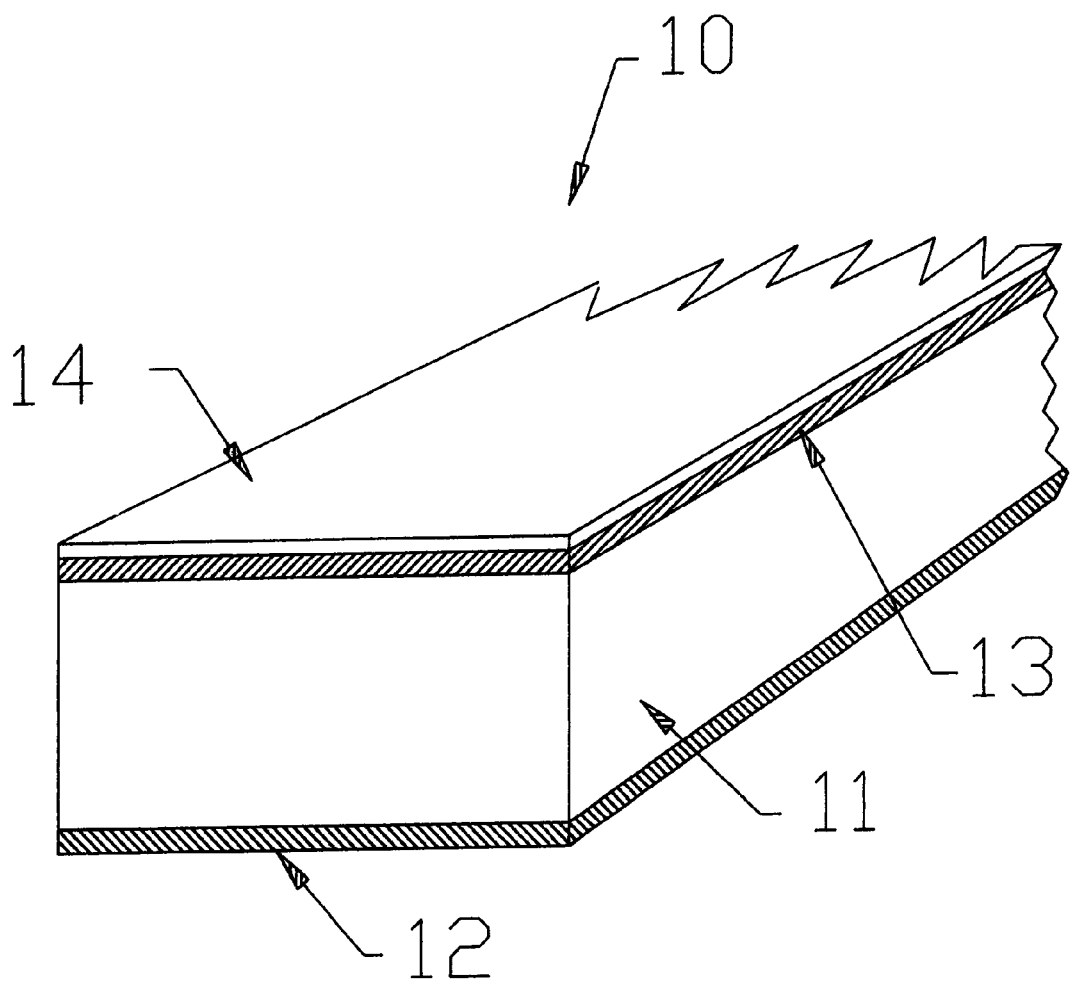
FIG. 1 is a cross-section view of a multi-layer magnetic tape in accordance with the invention.
Figure 5:
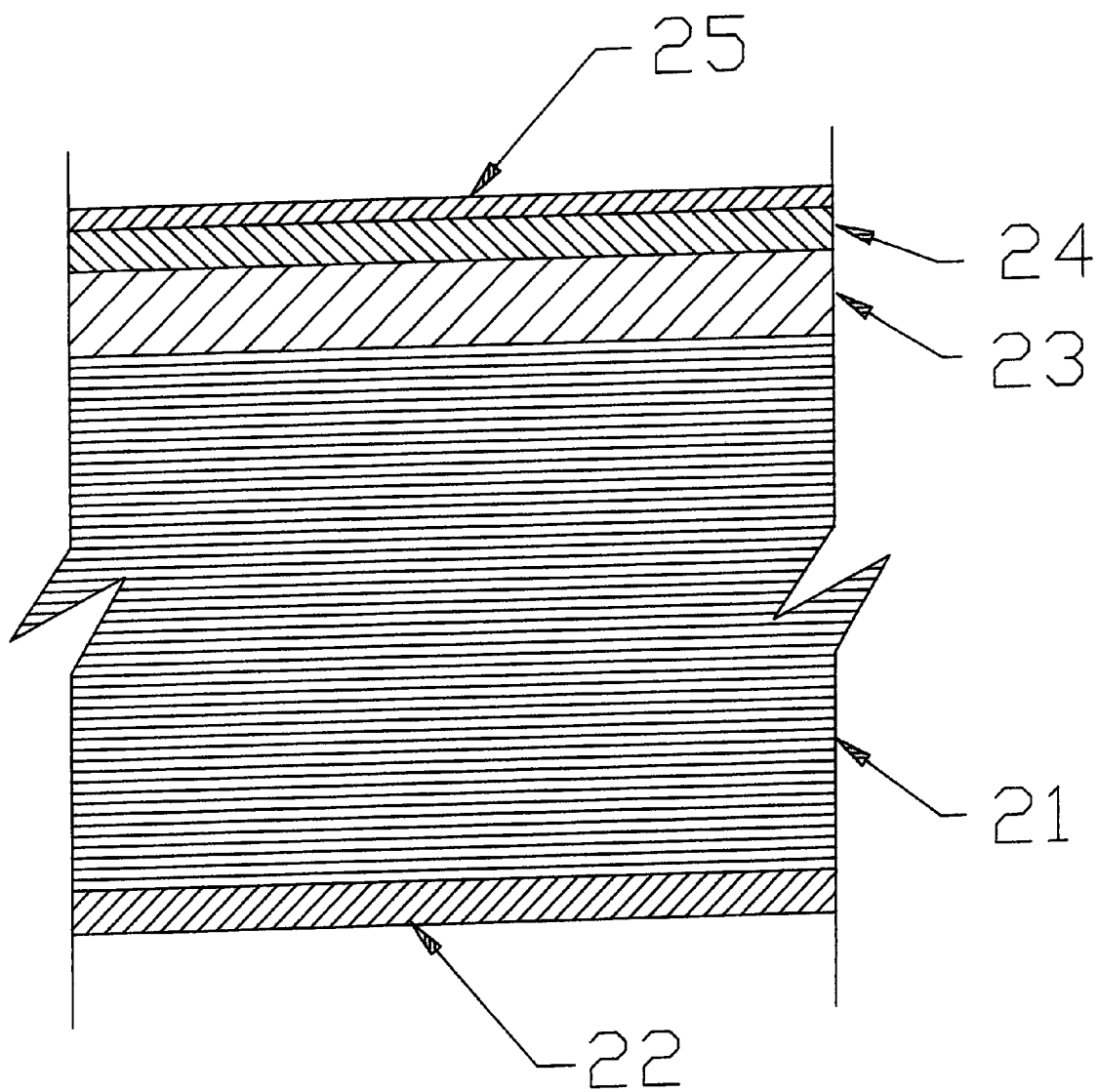
FIG. 5 is a cross-section view of a further multi-layer magnetic tape in accordance with the invention.

One exemplary embodiment of the multi-layer magnetic recording medium of the present invention is shown in FIG. 1 and is designated generally by reference numeral 10. It will be understood that the magnetic recording medium of the present invention includes all conventional types of media, including, among others, magnetic tape, flexible magnetic disks, rigid magnetic disks, magnetic cards and magnetic drums. A nonmagnetic substrate 11, which, as described below, can be any conventionally used substrate. For example, as shown in FIG. 1, substrate 11 may be a film of a synthetic resin such as polyester, which is provided with or without a back-coat 12 on one side to control frictional properties and electrostatic levels, enhance tape electrical performance, and/or improve runnability of the tape in a recording device. A similar back-coat 22 is shown in FIG. 5. The nonmagnetic substrate may also be, for example, polyesters such as a poly-ethylene terephthalate, a polyethylene-2,6-naphthalate, polyaromatic amide (aramid), etc., polyolefins such as a polypropylene, etc., cellulose derivatives such as cellulose triacetate, cellulose diacetate, etc. and plastics such as a polyamide, a polycarbonate, etc.

The thickness of the non-magnetic support is not particularly limited, but it is generally 3 to 100 $\mu$m, preferably 4 to 50 $\mu$m in the case of a film or a sheet and about 30 $\mu$m to 10 mm in the case of a disk or card and may be selected optionally depending on a recorder, in the case of a drum.

The non-magnetic substrate 11 or 21 may have a single layer structure or a multi-layer structure such as co-extrusion polymers. The non-magnetic support may be subjected to surface treatment on one or both sides such as corona discharge treatment, or chemical coatings or primers to improve adhesion of subsequent coatings.

A magnetic inner layer 13 containing ferromagnetic particles is provided on one side. Although not illustrated in FIG. 1, a primer layer to promote adhesion between magnetic inner layer 13 and the substrate 11 may be provided on the substrate between the lower layer and the substrate. An innermost layer 23 is illustrated in FIG. 5 of the drawings and is shown between substrate 21 and magnetic inner layer 24. This innermost layer 23 may contain ferromagnetic particles and/or non-magnetic particles. Generally the magnetic inner layer in a multi-layer structure will have a thickness of between about 0.1 to 3 $\mu$m. The thickness of magnetic inner layer 24 is preferably 0.1 to 1.5 $\mu$m and is more preferably 0.1 mm to 1.0 $\mu$m.

The magnetic inner layer 13 or 24 preferably has a squareness ratio of from 0.10 to 0.65 and a saturation magnetization of from $1.0 \times 10^{-4}$ to $1.5 \times 10^{-3}$ gauss-meter. To control maximum flux density, nonmagnetic particles can be added to the magnetic inner layer 13 or 24 in a ratio of ferromagnetic particles, such as iron oxide, to nonmagnetic particles of from 5:95 to 90:10. Preferably, the magnetic inner layer also has a coercive force of 10–1000 Oe and most preferably 10–300 Oe.

The thickness of the magnetic inner layer 13 or 24 is normally 0.1 to 3.0 $\mu$m, and preferably 0.1 to 2.0 $\mu$m, and more preferably 0.1 to 1.0 $\mu$m. If the thickness exceed 3.0 $\mu$m, so-called multiple layer surface roughness occurs, in which the magnetic outer layer surface roughness increases after multiple layer coating, which can result in undesirable electromagnetic properties. If the thickness is less than 1.0 $\mu$m, high smoothness is difficult to obtain with calendering, which can deteriorate the electromagnetic properties and spoil the effect of the magnetic inner layer 13 or 24. Innermost layer 23 is preferably used to resolve this problem by adding additional coating thickness without effecting the magnetic properties of the magnetic inner layer 13 or 24 by virtue of this coating being predominantly nonmagnetic.

Examples of the magnetic parties used in the magnetic inner layer 13 or 24 include $CrO_2$ and ferromagnetic iron oxide particles such as $\gamma\text{—}Fe_2O_3$; $Fe_3O_4$; intermediate iron oxide compounds represented by $FeO_x$ ($1.33 \leq x \leq 1.5$), Coadduct (cobalt-modified) iron oxide compounds represented by $Co\text{—}FeO_x$ ($1.33 \leq x \leq 1.5$), and iron oxides having the formula $XFe_2O_4$, where X is Mn, Ni, Mg, Zn or Cu.

With respect to these particles for the magnetic inner layer 13 or 24, the particles will normally be acicular, spherical or a mixture of acicular and spherical particles. Acicular particles preferably have a major axis length less than or equal to 0.30 $\mu$m, and spherical particles preferably have an average particle diameter of 5 to 150 nm. When major axis length or average particle diameter falls within these ranges, the electric properties, as well as surface quality, of the magnetic recording medium are improved.

The coating solution used to create magnetic inner layer 13 or 24 preferably includes soft magnetic particles, a binder, and a solvent. The soft magnetic particle to be used is not particularly limited in kind as long as it is a soft magnetic particle. Magnetic materials used in miniature electrical devices, such as a magnetic head and an electron circuit, are particularly preferred. Spinel type ferrite particles are the preferred type of soft magnetic oxide particle used in magnetic inner layer 13 or 24. The spinel type ferrite particles include $MnFe_2O_4$, $Fe_3O_4$, $CoFe_2O_4$, $NiFe_2O_4$, $MgFe_2O_4$, $Li_{0.5}Fe_{2.5}O_4$, Mn—Zn type ferrite, Ni—Zn type ferrite, Ni—Cu type ferrite, Cu—Zn type ferrite, Mg—Zn type ferrite, and Li—Zn type ferrite. Most preferred are Mn—Zn type ferrite and $Fe_3O_4$. These soft magnetic materials may be used either individually or in a combination of two or more types.

Soft-magnetic metal particles can also be used as the soft magnetic particles in magnetic inner layer 13 or 24. Useful soft magnetic metal particles include Fe—Si alloys; Fe—Al alloys; Permalloy (e.g., Ni—Fe binary alloys or multinary alloys composed of the Ni—Fe binary alloy and Mo, Cu, Cr, etc); Sendust (Fe—Si—Al alloy consisting of 9.6 wt % of Si, 5.4 wt % of Al, and the balance of Fe); and Fe—Co alloys. These particles also may be used either individually or in combinations of two or more. Their average particle size is about 5 nm–150 nm. For soft metal particles, a spherical shape or an acicular shape with an acicular ratio of less than 2 is preferable.

A magnetic outer layer 14 or 25 having a thickness of 0.05 to 1.0 $\mu$m and containing ferromagnetic particles is provided on top of the magnetic inner layer 13 or 24 respectively. Nonmagnetic particles can also be present in the magnetic outer layer 14 or 25. The magnetic outer layer 14 or 25 of the magnetic recording medium can contain one or more types of ferromagnetic particles including ferromagnetic iron oxide particles, ferromagnetic metal particles having a coercive force (Hc) of 1,700 to 4,000 Oe, cobalt-modified ferromagnetic iron oxide particles; chromium dioxide particles, and hexagonal ferrite particles having a coercive force of 1,400 to 5,000 Oe. Coercive forces out of these ranges are undesirable because electromagnetic recordings are not practical for current head designs like giant magneto resistive devices and deteriorate at coercive forces of lower than 600 Oe and because recording can fail with ordinary heads at coercive forces exceeding 5000 Oe. These magnetic particles may be used alone or in combination. As noted, the magnetic outer layer contains metal particles as an essential magnetic particle component. This ferromagnetic particle can contain Fe, Co, Al and one or more rare earth elements selected from the group consisting of Sm, Nd, Y, La, Pr, and Ce.

Examples of acceptable ferromagnetic iron oxide particles include $\gamma$—$Fe_2O_3$; $Fe_3O_4$; their intermediate iron oxide compounds represented by $FeO_x$ (1.33<x<1.5); and Co-adduct (cobalt-modified) iron oxide compounds represented by $FeO_x$ (1.33<x<1.5). The ferromagnetic particles can be surface treated by an aluminum compound and/or a silicon compound to enhance the dispersability of the various particles in the binder used to produce the layer. Surface treatment can be carried out by coating the surface of the magnetic particle with an inorganic oxide. The inorganic oxide used in this surface treatment may include, for example, $Al_2O_3$, $SiO_2$, $TiO_2$, $SnO_2$, ZnO. These inorganic oxides may be used either individually or in combination with others of these oxides. The surface treatment may also be conducted with organic compounds which are a silane coupling agent, a titanium coupling agent or an aluminum coupling agent. Surface treatment with these compounds improves the affinity between the ferromagnetic particles and polyurethane or vinyl chloride binders typically employed.

Ferromagnetic particles suitable for use in magnetic outer layer 14 or 25 typically have a major axis length not greater than 0.30 $\mu$m. Ferromagnetic particles of this size exhibit improved electric properties and surface quality. Also, the saturation magnetization (as), a magnetic property of the ferromagnetic metal particle is preferably not lower than 70 emu/g. If the saturation magnetization is lower than 70 emu/g, the electromagnetic converting property can deteriorate. When this ferromagnetic particle is a ferromagnetic metal particle, in particular, the saturation magnetization is preferably not lower than 120 emu/g. The solution used to form magnetic outer layer 14 or 25 contains 60 to 95% by weight, preferably 70 to 90% by weight and more preferably 75 to 85% by weight of ferromagnetic particles.

The hexagonal ferrite particle used in accordance with the invention includes fine tabular particles of barium ferrite or strontium ferrite and these particles with the Fe atoms thereof partly displaced with Ti, Co, Ni, Zn, V or the like atoms. The hexagonal ferrite particle preferably has a tabular diameter of 0.02 to 0.09 $\mu$m and as acicular ratio of 2 to 7.

The most preferable ferromagnetic metal particles described above are particularly suited for use because they have a high coercive force (Hc) of not lower than 1700 Oe, a high saturation magnetization ($\sigma_s$) of not lower than 120 emu/g and high dispersability.

In the present invention, various known nonmagnetic particles can be included optionally as appropriate. Examples of nonmagnetic particles include carbon black, graphite, $TiO_2$, barium sulfate, ZnS, $CaCO_3$, ZnO, CaO, tungsten disulfide, molybdenum disulfide, boron nitride, MgO, $SnO_2$, $SiO_2$, $Cr_2O_3$, $\alpha$—$AL_2O_3$, $\alpha$—$Fe_2O_3$, $\alpha$—FeOOH, SiC, cerium oxide, corundum, artificial diamond, a-iron oxide, garnet, silicate, silicon nitride, boron nitride, silicon carbide, molybdenum carbide, boron carbide, tungsten carbide, titanium carbide, tripoli, diatomaceous earth and dolomite. Of these nonmagnetic particles, preferences is given to inorganic particles such as carbon black, $CaCO_3$, $TiO_2$, barium sulfate, $\alpha$—$Al_2O_2$, $\alpha$—$Fe_2O_3$, $\alpha$—FeOOH and $Cr_2O_3$.

An acicular nonmagnetic particle is preferably used in order to improve surface smoothness of one or all of the layers in the medium. The major axis length of the nonmagnetic particle is normally not greater than 0.30 $\mu$m, preferably not greater than 0.20 $\mu$m, and more preferably not greater than 0.15 $\mu$m. The minor axis length of the nonmagnetic particle is normally not greater than 0.10 $\mu$m, preferably not greater than 0.08 $\mu$m and more preferably not greater than 0.06 $\mu$m. The acicular ratio of the nonmagnetic particle is normally 2 to 20, preferably 2 to 15, and more preferably 2 to 10. The acicular ratio is defined as the ratio of the major axis length to the minor axis length. The specific surface area of the nonmagnetic particle is normally 10 to 250 $m^2$/g, preferably 20 to 150 $m^2$/g, and more preferably 30 to 100 $m^2$/g. It is preferable to use a nonmagnetic particle whose major axis length, minor axis length, acicular ratio and specific surface area fall within the ranges above, because the surface quality of the magnetic outer layer 14 or 25, as well as the surface quality of the magnetic inner layer 13 or 24 or innermost layer 23, can be improved.

In the present invention, the same materials used in surface treating ferromagnetic particles discussed above are also useful in surface treating nonmagnetic particles. The nonmagnetic particles incorporated into a medium in accordance with the present invention is preferably surface treated with an Si compound and/or an Al compound. Using a nonmagnetic particle after such surface treatment offers a good surface condition of the magnetic outer layer 14 or 25. The Si and/or Al content is preferably 0.1 to 10 parts by weight of Si and 0.1 to 10 parts by weight of Al relative to the nonmagnetic particle.

The content of the nonmagnetic particle in the magnetic inner layer 13 or 24, CES normally 5 to 95 parts by weight, preferably 20 to 80 parts by weight, and more preferably 50 to 70 parts by weight of the total content of all components of the magnetic inner layer 13 or 24. Provided that nonmagnetic particle content falls within the above range, the surface conditions of the magnetic outer layer and the magnetic inner layer can be improved.

Figure 2:
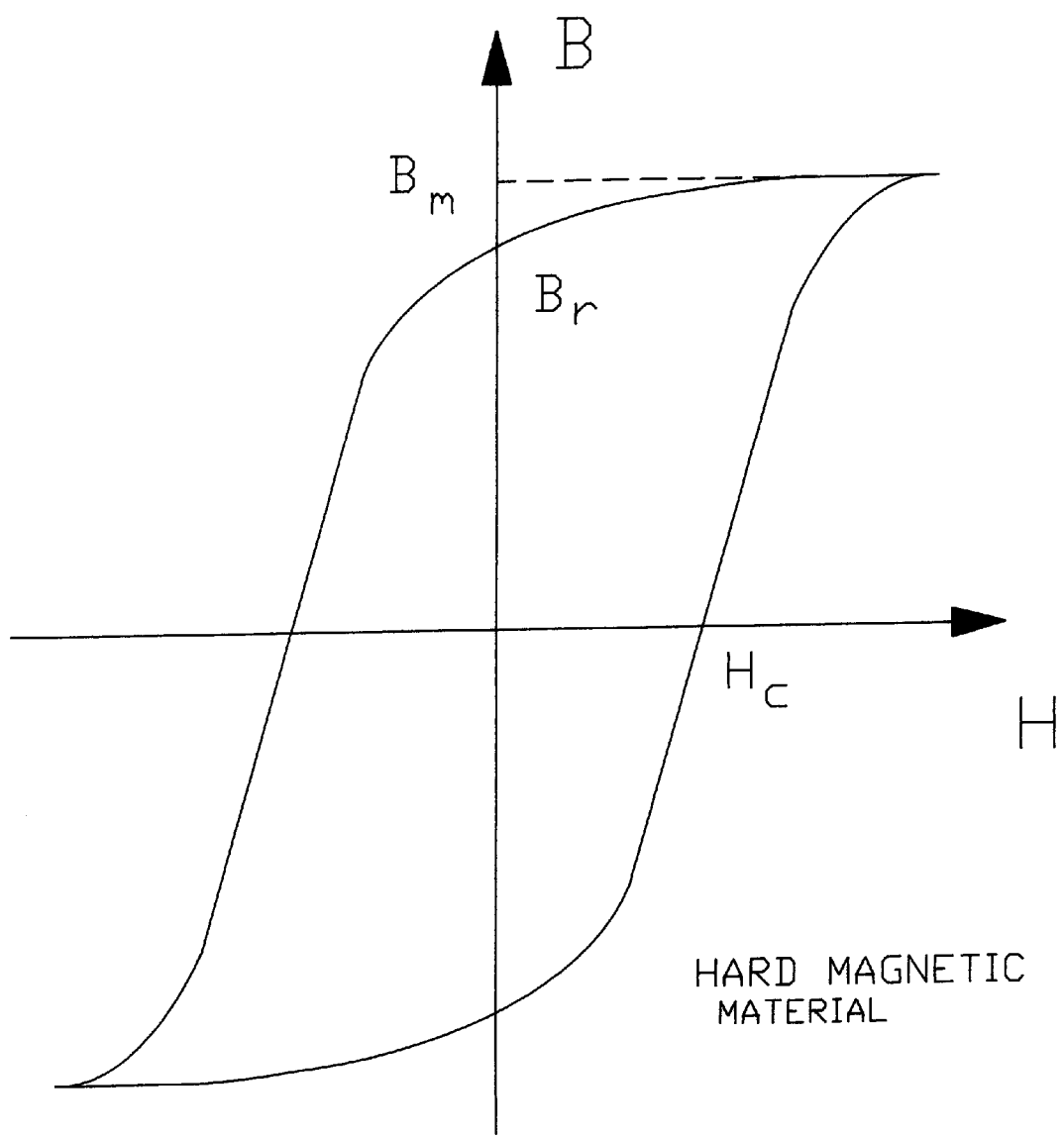
FIG. 2 is a plot of magnetic flux vs. coercive force to illustrate squareness ratio for hard magnetic materials.
Figure 3:
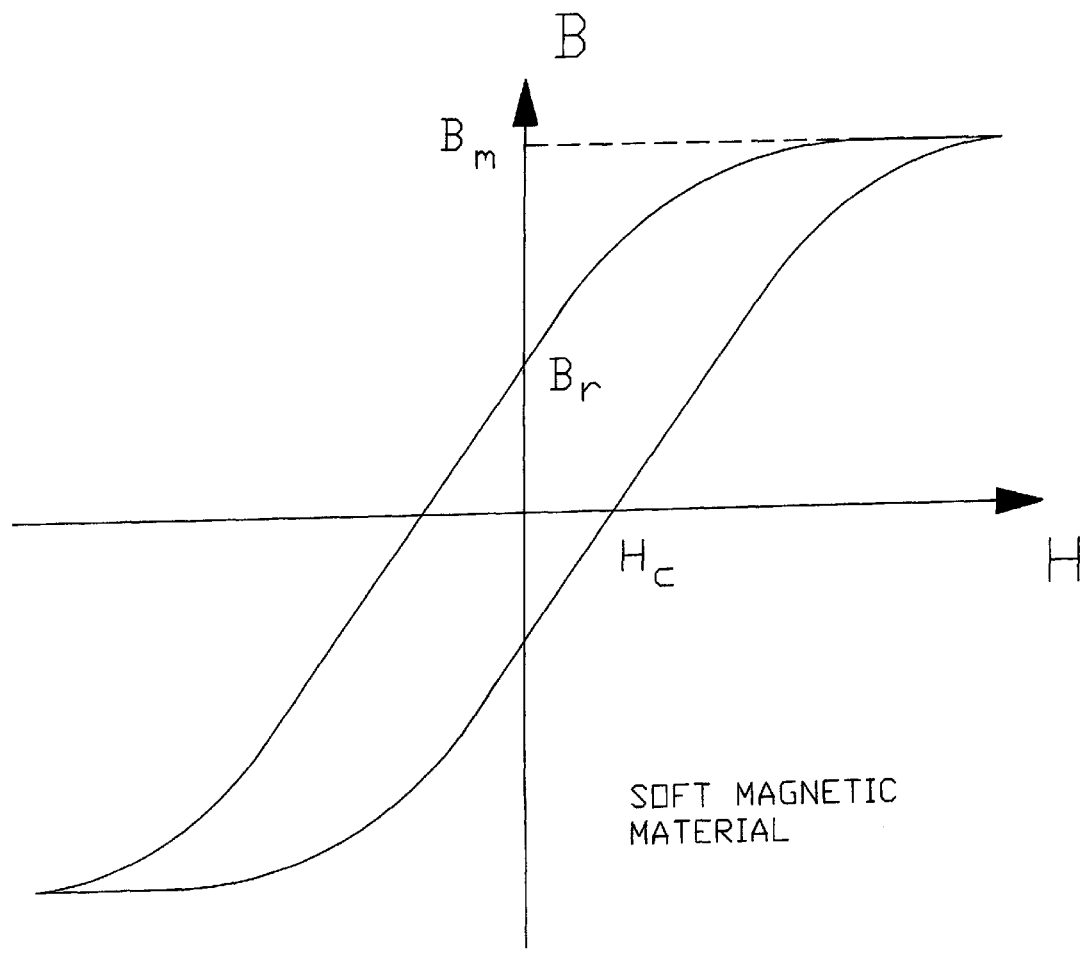
FIG. 3 is a plot of magnetic flux vs. coercive force to illustrate squareness ratio for the soft magnetic materials used in a medium in accordance with the invention.
Figure 4:
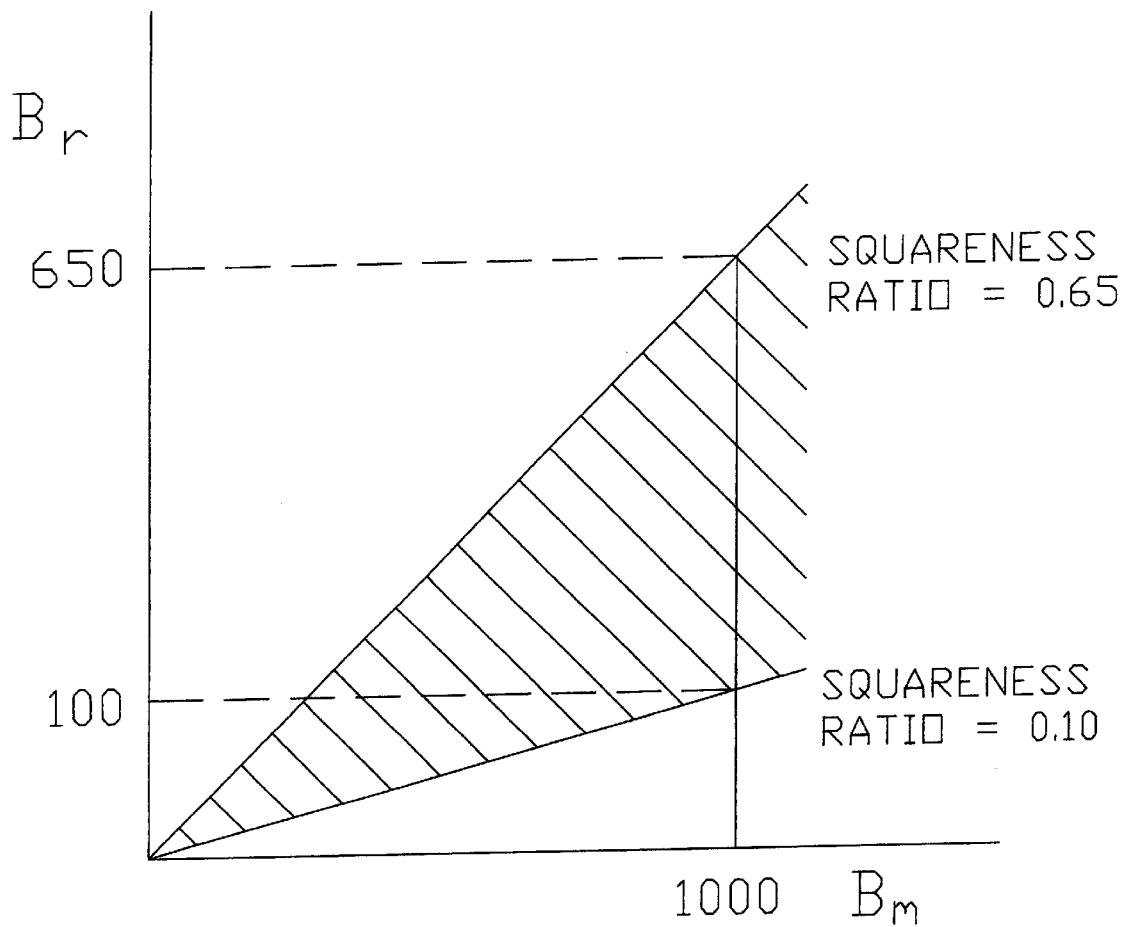
FIG. 4 is a plot of residual magnetic flux vs. maximum magnetic flux to compare squareness ratios in the range of 0.10 to 0.65.

Improved overwrite performance and high radio frequency output are achieved in a medium according to the present invention by employing a magnetic inner layer 13 or 24 in multi-layer magnetic recording medium, the magnetic inner layer 13 or 24 having a low squareness ratio of 0.10 to 0.65 and a saturation magnetization (Bm×the thickness of magnetic inner layer) of from $1.0 \times 10^{-4}$ to $1.5 \times 10^{-3}$ gauss-meter. Squareness ratio is defined as the ratio of remanent flux density (Br) to magnetic flux density (Bm) as shown in FIG. 4 of the drawings. The relationship between coercive force (Hc), magnetic flux density (Bm) and remanent flux density (Br) for "hard" magnetic materials and "soft" magnetic materials is illustrated graphically in FIGS. 2 and 3 respectively.

The thickness of typical magnetic outer layers is conventionally defined to be one quarter of the shortest wavelength ($\lambda$) of the information to be recorded on the medium. The trend in the recording medium industry is for information to be recorded at higher and higher frequencies (shorter wavelengths) in order to increase the recording density of the medium. This trend toward higher frequency recording leads to a requirement for thinner and thinner magnetic upper layers in media designed to record such high frequency information.

Overwrite performance is improved by the structure of a medium in accordance with the present invention. The soft magnetic inner layer 13 or 24 directs the majority of the magnetic flux lines of the record head back into the magnetic outer layer 14 or 25. Even though soft magnetic inner layer 13 or 24 is magnetically conductive, soft magnetic inner layer 13 or 24 has limited capacity to retain any significant magnetic flux because the layer has a relatively low Br (i.e., a relatively low squareness ratio). The low level of retained fringe signal in the soft magnetic inner layer is easy to erase or overwrite because the retained signal offers little counter resistance to the magnetic flux generated by typical erase heads or record heads during the overwriting process.

Overwrite performance of a medium in accordance with the invention is better than traditional dual-layer media containing two hard magnetic layers or a non-magnetic inner layer and a hard magnetic outer layer. For a dual-layer medium having hard magnetic inner and outer layers, magnetic flux from the record head magnetizes both the magnetic inner and outer layers. Because of the high residual flux that is typical of hard magnetic inner layers, the retained fringe signal in the magnetic inner layer is more difficult to erase or overwrite. Either greater energy is required by the erase head to adequately erase these signals or typical record heads do not generate enough flux to overwrite completely the residual fringe signal in the hard magnetic inner layer, which may result in corrupted overwritten data.

For media having a non-magnetic inner layer and a hard magnetic outer layer, the non-magnetic inner layer retains no signal and thus does not contribute to the difficulty of erasure by the erase head. Typical erase heads thus adequately erase the magnetic outer layer for both the media in accordance with the invention and media containing a non-magnetic inner layer and a hard magnetic outer layer. However, the overwrite performance of the two types of media is not the same. Because the magnetic flux from the record head is not conducted by a nonmagnetic inner layer, the magnetic flux area of the magnetic outer layer is larger for such media than it is for media in accordance with the invention. Thus, completely overwriting data in the magnetic outer layer of a media having a non-magnetic inner layer is more difficult than overwriting data in the magnetic outer layer of the media in accordance with the invention. The relatively poor overwrite performance of media having non-magnetic inner layers results in a greater number of corrections of corrupt data than is required for the media in accordance with the invention.

The RF output of a medium in accordance with the invention is also improved by the presence of the soft magnetic inner layer because the retained recorded signal is more confined and concentrated primarily in the outermost portion of the magnetic outer layer. Because the coercivity of the particles in the soft magnetic inner layer 13 or 24 is relatively low (10 to 1,000 Oe), long wavelength information is relatively easily recorded in the soft magnetic inner layer 13 or 24. The relatively high initial magnetic flux (Bm) from the soft magnetic inner layer 13 or 24 leads to a demagnetization of the immediately adjacent portion of the magnetic upper layer 14 or 25. The low squareness ratio of the soft magnetic inner layer 13 or 24 results in a relatively strong recorded signal that dissipates quickly to a relatively weak retained signal. Thus, the demagnetization of the upper layer is limited because the low squareness ratio of the soft magnetic inner layer 13 or 24 leads to a small residual magnetic flux (Br) in the soft magnetic layer. Thus, only the immediately adjacent portion of the magnetic upper layer 14 or 25 is demagnetized. The result is that the effective thickness of the magnetic upper layer 14 or 25 is thinner than its physical thickness. The advantage created by such controlled and intentional demagnetization of the magnetic upper layer 14 or 25 by the soft magnetic inner layer 13 or 24 is that the magnetic upper layer 14 or 25 may be physically thick enough to manufacture efficiently while also being effectively thin enough to perform as well as a much thinner (and harder to manufacture) upper layer. For example, the effective thickness of magnetic outer layer 14 or 25 is still approximately 0.25 λ even though the physical thickness of magnetic outer layer 14 or 25 may be approximately 0.27 λ to 0.50 λ.

Media in accordance with the invention are also superior to conventional media incorporating the single layer and multiple layer coatings that are used in the application of perpendicular recording methods. Perpendicular orientation of the particles in the magnetic outer layer 14 or 25 permits more efficient alignment of magnetic flux lines with the more easily recorded axis of the particles in the magnetic outer layer to the soft magnetic inner layer. By virtue of the properties of the soft magnetic inner layer 13 or 24 described above, the recorded signal is confined and concentrated to only the outermost portion of the magnetic outer layer 14 or 25, an area much smaller than recordings made with particles that utilize acicular particles that are orientated in the machine-direction and use non-magnetic inner layer or magnetic inner layer. Similar improvements are experienced when a soft magnetic inner layer is incorporated into in a medium in which the particles in the magnetic outer layer are vertically oriented. This allows greater recording densities and capacity of stored information.

Coating solutions used to form magnetic and nonmagnetic layers in accordance with the present invention are made by kneading a magnetic particle, a binder, a dispersing agent, a lubricant, an abrasive, an antistatic agent and other additives and a solvent to yield a dense magnetic coating composition. This dense composition is then diluted with a solvent to yield a magnetic coating solution. The coating solution is applied to the surface of the nonmagnetic substrate, which may already be coated with one or more magnetic or non-magnetic layers.

In the kneading and dispersion of the magnetic layer forming components, various kneaders can be used. Examples of the kneader include the two-roll mill, three-roll mill, ball mill, pebble mill, cobble mill, Tron mill, sand mill, sand grinder, high speed impeller disperser, high speed stone mill, high speed impact mill, disper kneader, high speed mixer, homogenizer, ultrasonic disperser, open kneader, continuous kneader and pressure kneader.

Examples of the solvent include ketones such as acetone, methyl ethyl ketone, methyl isobutyl ketone and cyclohexanone; alcohols such as methanol, ethanol and propanol; esters such as methyl acetate, ethyl acetate, butyl acetate, propyl acetate, ethyl lactate and ethylene glycol monoacetate; ethers such as diethylene glycol dimethyl ether, 2-ethoxyethanol, tetrahydrofuran and dioxane; aromatic hydrocarbons such as benzene, toluene and xylene; and halogenated hydrocarbons such as methylene chloride, ethylene chloride, carbon tetrachloride, chloroform, ethylene chlorobydrin and dichlorobenzene.

In the present invention, surface smoothing by calendering is preferable. Calendering factors adjusted for surface smoothing include temperature, linear pressure and line speed. In the present invention, it is preferable to keep a temperature of 500 to 140° C., a linear pressure of 50 to 400 kg/cm and a line speed of 20 to 1000 m/min. This surface smoothing may be followed by varnish treatment or blade treatment as necessary, and subsequent slitting.

Figure 6:
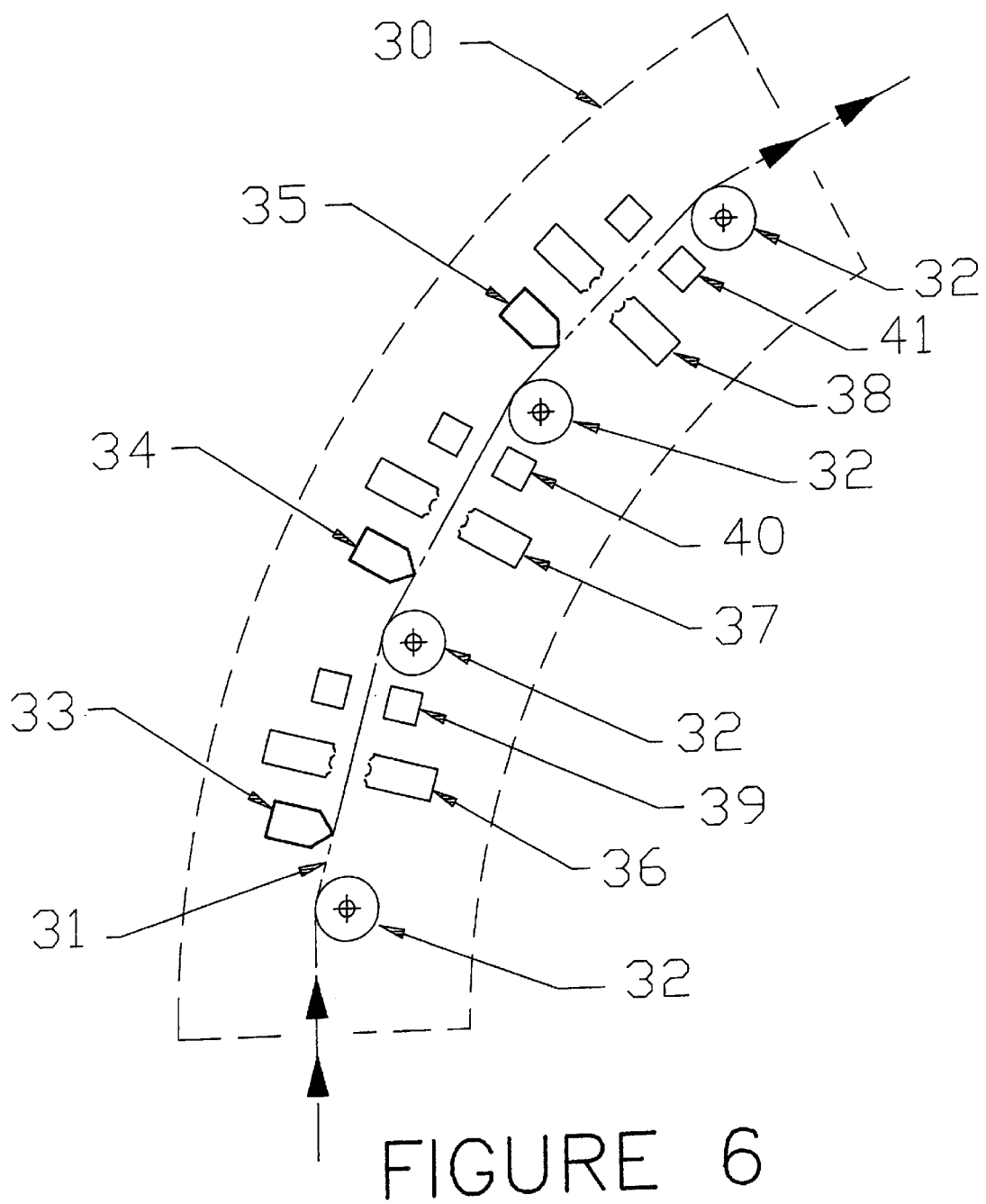
FIG. 6 is an overhead schematic view indicating the successive stations for carrying out the method of the present invention.
Figure 7:
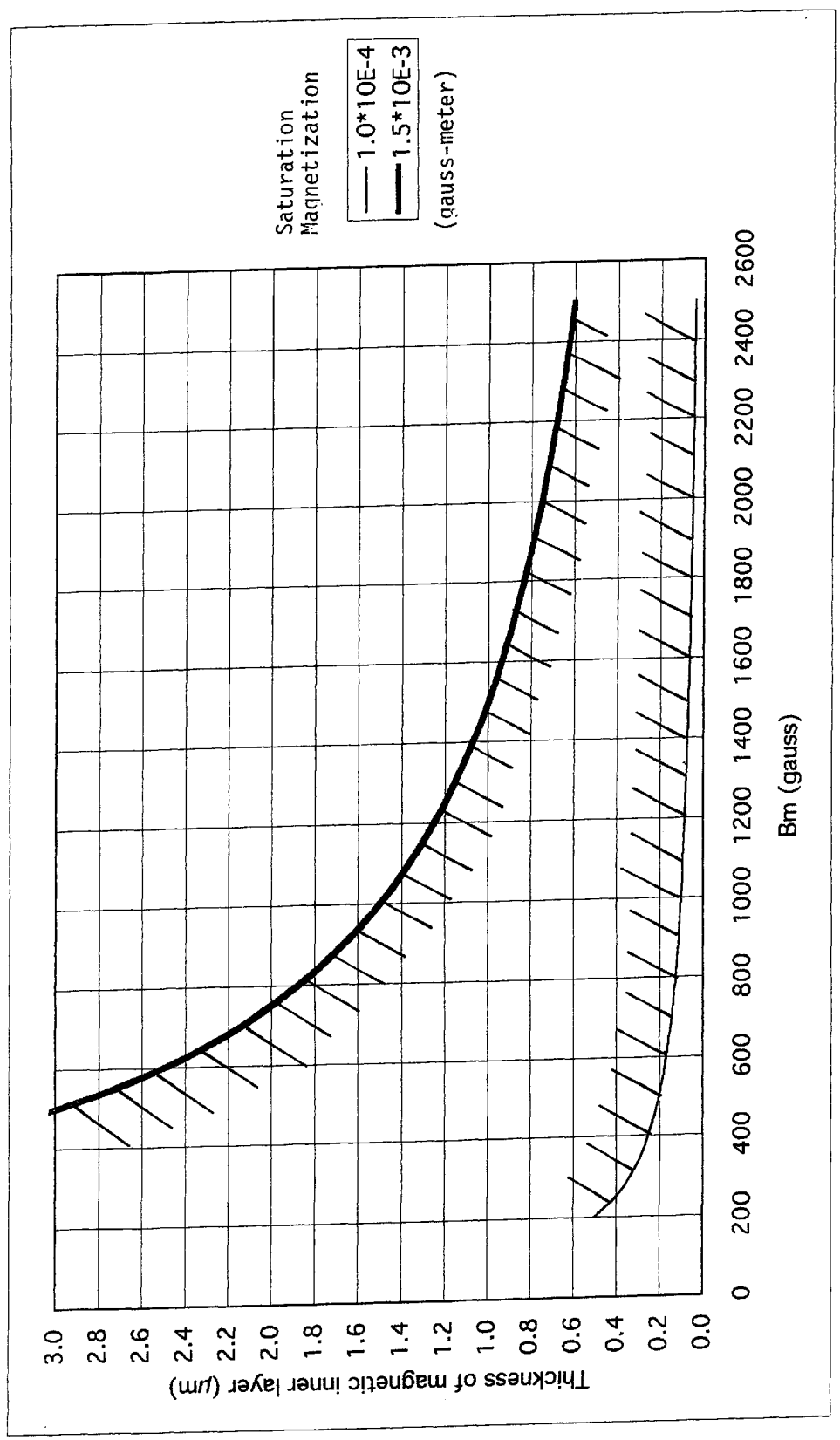
FIG. 7 is a plot of the thickness of a magnetic inner layer in accordance with the invention versus maximum magnetic saturation flux density for the magnetic inner layer.

The multi-layer magnetic recording medium of the present invention can be formed on a substrate by conventional methods such as roll coating, slot die extruding or spraying, or a combination of these methods. These coating methods may be performed using wet-on-wet methods where the uppermost layer is formed while the lower layer is still wet, or wet-on-dry methods where the lower layer is first dried. However, a preferred method for forming the magnetic recording medium of the invention, as well as other magnetic recording media utilizing multi-layers involves a controlled drying of the inner layers and is illustrated in FIG. 6 of the drawings. A curved support 30 is provided with a plurality of rollers 32 which serve to guide the path of a moving nonmagnetic substrate 31 onto which the layers are formed to constitute the magnetic recording medium. Successive layers of the magnetic or nonmagnetic material carried in a suitable solvent/binder are applied to the substrate 31 as it moves past the respective nozzles 33, 34, and 35 in the direction indicated by the arrow. The nozzles used in accordance with the invention can be conventional nozzles commonly used for such applications, such as infinite cavity or converging cavity types having, for example, a "coat-hanger" shape and using parallel planes at the nozzle outlet.

In accordance with the present invention, between each pair of nozzles 33, 34, and 35 are a pair of dryer elements 36, 37, and 38 respectively disposed on side of the moving substrate 31. These drying elements preferably are infrared heaters, micro-wave devices, microsonic heaters, and/or blowers to convey heat by either conduction, convection, radiation or a combination thereof. The dryers are utilized to evaporate solvents in a controlled manner to begin to plasticize the outer most surface of the applied layer in order to achieve optimum surface characteristics for application of the next layer. As an adjunct to the drying process, particle orientation can be achieved in accordance with the invention by also providing magnetic orientation devices 39, 40, and 41 between the drying elements 36, 37, and 38 and the next nozzle 33, 34, and 35. The magnetic orientation devices 39, 40, and 41 can orient the magnetic particles in the direction of tape transport, transverse direction to tape transport, vertically, in another desired direction, or randomly.

In accordance with the invention, optimum surface characteristics are achieved by providing intermediate drying stages. This intermediate drying prevents substantial intermixing of the applied fluid coatings with the previous layers. The intermediate drying process is also performed in a manner to avoid defects from streaks, ribs, and/or pimples caused by the coating being too fluid or unstable when the subsequent coating is applied. The described drying zones can be provided on either the coated side or back side of the moving substrate or both and can consist of impinging drying gases. Solvent saturation and temperature of the dryer gas or other drying medium are two of the parameters which can be retarded or increased to affect the rate of drying of the coated surface in preparation for applying the next drying elements within the controlled coating enclosure can be provided on either the coated side or back side of the moving substrate 31, or a combination thereof. Drying by directing impinging gases on the back side of the substrate 31 promotes or encourages solvent evaporation from the inner most layer outwards. This effect prevents "skimming" of the outer most surface and reduces the volume of retained solvents in the completely dried coating. Secondly, this approach allows better orientation of the magnetic particles in the inner layer 13 or 24 in that some plasticizing can be achieved to prevent disorientation after the subsequent orientation step. Front side impingement against the wet coating may be appropriate under some circumstances desirous because the outer most surface of the coating can be optimized to receive the subsequent coating layer.

The optimum degree of drying is the maximum amount that can be performed while maintaining good coatability of the subsequent layer. This is primarily based upon observing the coating as it is applied and insuring that the surface is free of ribs, streaks, lumps, and/or disturbances. The drying effect of the oven gases in the enclosure is precisely controlled by controlling mass flow rates and temperatures in both the enclosure and the dryer elements. The flow rate of the oven gases in the enclosure are also precisely controlled by monitoring mass flow rates. Additionally, temperatures are controlled in both the enclosure and the dryer elements. The flow rate and temperature of the oven gases (e.g., air, nitrogen or carbon dioxide) is controlled at an impingement velocity of 5 m/sec to 500 m/sec at temperatures of 2° C. to 100° C. Make-up gases control the level of solvent vapor enclosure at an acceptable level are introduced into the enclosure at a rate proportional to the speed of the moving substrate. The flow rate of make-up gas is controlled in the range of 0.3 to 4.5 $m^3$/min per $m^2$/min substrate. The drier is operated at about 30° to 120° C. The concentration of water vapor in the oven gases is controlled in the range of 0 to 1.4 grams moisture per Kg dry gas. Solvent levels in the enclosure are constantly monitored and conditions are controlled to yield the desired surface properties without surface defects or intermixing of the adjacent layers. The concentration of solvent vapor within the enclosure is proportional to the degree of drying of the coated layer.

The controlled drying process performed between coating applications in accordance with the present invention is superior to prior art "wet-on-wet" processes in which subsequent coatings are applied while the prior coating is still in a fluid condition. Additionally, the present invention realizes significant economies of time and efficiency over conventional wet-on-dry methods and enhanced product consistency. The coatings of the invention are characterized by better surface control and final coating quality that results in higher process yields and magnetic performance of the final product. Intermediate magnetic orientation is used to add stiffness to the lower layer, optimize electrical performance of the lower layer, and achieve desired orientation. The orientation of the upper most layer is performed to control squareness ratios and orient the magnetic particles to the optimum position for best recording for a particular format. Orientation in accordance with the invention can be accomplished using either permanent magnets and/or electronic orientation devices. The magnetic field of the orientation magnet or vertical orientation magnet is about 20 to 10,000 Gauss.

Particles employed in the magnetic layers of the invention are predominately magnetic in nature and can contain γ-ferric oxide, cobalt γ-ferric oxide, metal particles, and/or barium ferrite. Preferably, the ferromagnetic metal particle will have a coercivity of 1,700 to 4,000 Oe and the barium ferrite between 1,400 and 5,000 Oe.

As previously noted, the respective layers applied to the nonmagnetic substrate in accordance with the present invention are applied by a series of nozzles which can extrude, spray, or paint the coating solution onto the moving medium. The solution of magnetic or nonmagnetic material applied in accordance with the invention through the respective nozzles is otherwise conventional and generally comprises a particle combined with a suitable binder and solvent.

The binder contained in the magnetic outer layer, magnetic inner layer, or innermost layer is typically exemplified by polymer resins such as polyurethane, polyester and vinyl chloride copolymers. These resins preferably contain repeat units having at least one polar radical selected from the group consisting of -$SO_3M$, —$OSO_3M$, —COOM, —PO$(OM')_2$ and sulfobetaine. With respect to the above polar radicals, M represents a hydrogen atom or an alkali metal such as sodium, potassium or lithium, and M' represents a hydrogen atom, an atom of an alkali atom such as sodium, potassium or lithium or an alkyl group.

The polar radical described above improves the dispersability of ferromagnetic particles, and its content in each resin is 0.05 to 8.0 mmol/g, and preferably 0.07 to 6.0 mmol/g. If this content is lower than 0.05 mmol/g, the dispersability of ferromagnetic particle decreases, and if it exceeds 8.0 mmol/g, the magnetic coating composition becomes subject to gelation. The weight-average molecular weight of each resin described above is preferably 15,000 to 50,000.

The binder content in the magnetic layer or non-magnetic layer is normally 5 to 25 parts by weight, preferably 10 to 20 parts by weight to 100 parts by weight of ferromagnetic and/or nonmagnetic particles. These binders may be used individually or in combination of two or more. In this case, the ratio of polyurethane and/or polyester and to vinyl chloride resin is normally 90:10 to 10:90, preferably 70:30 to 30:70 by weight.

A vinyl chloride copolymer containing a polar radical used as a binder for the present invention can be synthesized by addition reaction of a copolymer containing a hydroxyl group such as a vinyl chloride-vinyl alcohol copolymer, and compounds having a polar radical and chlorine atom. Preferably, the vinyl chloride copolymer has an epoxy group introduced therein. Introducing such an epoxy group improves the thermal stability of the vinyl chloride copolymer. When introducing an epoxy group, the content of the epoxy-containing repeat unit in the copolymer is preferably 0.1 to 30 mmol/g, more preferably 0.1 to 20 mmol/g. Glycidyl acrylate is preferred as a monomer to introduce the epoxy group.

In the present invention, other components may be added in the uppermost magnetic outer layer, magnetic inner layer, or innermost layer to improve its quality, including an abrasive, a lubricant, a durability improving agent, a dispersing agent, an antistatic agent and electromagnetic finer particle. The abrasive may be any one of a number of conventional substances. The average particle size of the abrasive is normally 0.05 to 0.6 $\mu$m, preferably 0.05 to 0.5 $\mu$m, and more preferably 0.05 to 0.3 $\mu$m. The content of the abrasive in the magnetic outer layer, magnetic inner layer, or innermost layer is normally 3 to 20 parts by weight, preferably 3 to 15 parts by weight, and more preferably 3 to 10 parts by weight.

A fatty acid and/or a fatty acid ester can be used as a lubricant. In this case, the addition amount of fatty acid is preferably 0.2 to 10 parts by weight, more preferably 0.5 to 5 parts by weight of magnetic and/or non-magnetic particles. If the addition amount is lower than 0.2 parts by weight, the runnability may deteriorate; if it exceeds 10 parts by weight, fatty acid oozes out onto the surface of magnetic layer and output reduction becomes more likely to occur. For enhancing the lubricating effect by using fatty acid and fatty acid ester in combination, the weight ratio of the fatty acid and fatty acid ester is preferably 10:90 to 90:10. The fatty acid may be monobasic or dibasic, preferably having from 6 to 30 carbon atoms, more preferably 12 to 22. Examples of fatty acids include caproic acid, caprylic acid, capric acid, lauric acid, myristic acid, palmitic acid, stearic acid, isostearic acid, linolenic acid, oleic acid, elaidic acid, behanic acid, malonic acid, succinic acid, maleic acid, glutaric acid, adipic acid, pimelic acid, azelaic acid, sebacic acid, 1,12-dodecanedicarboxylic acid and octanedicarboxylic acid.

Examples of fatty acid esters include oleyl oleate, isosetyl stearate, dioleyl malate, butyl stearate, butyl palmitate, butyl myristate, octyl myristate, octyl palmitate, pnetyl stearate, pentylpalmitate, isobutyl oleate, stearyl stearate, isuryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laureate, setyl-2-ethyl hexalate, dioleyl adipate, diethyl adipate, diisobutyl adipate, diisodecyl adipate, oleyl stearate, 2 -ethylhexyl myristate, isopentyl palmitate, isopentyl stearate, diethylene glycol-monoburyl ether palmitate and diethylene glycol-mono-butyl ether palmitate. In addition to the fatty acids and fatty acid esters described above, known substances can be used as lubricants, such as silicone oil, carbon fluoride, fatty acid amide and $\alpha$-olefin oxide.

Examples of hardeners used as durability enhancers include polyisocyanates, exemplified by aromatic polyisocyanates such as active hydrogen compound adducts of trilenediisocyanate (TDI) and aliphatic polyisocyanates such as active hydrogen compound adducts of hexamethylene diisocyanate (HMDI). The weight-average molecular weight of polyisocyanate is desirably 100 to 3000.

Examples of dispersants include fatty acids having from 12 to 18 carbon atoms such as caprylic acid, capric acid, lauric acid, myristic acid, palmitic acid, stearic acid and oleic acid; alkali metal salts, alkaline earth metal salts or amides thereof; polyalkylene oxide alkyl phosphates; lecithin; trialkylpolyolefin oxy-quaternary-ammonium salt; and azo compounds having a carboxyl group and/or a sulfonic acid group. These dispersants are used normally in 0.5 to 5 parts by weight of ferromagnetic and/or non-magnetic particle.

Examples of antistatic agents include cationic surfactants such as quaternary amine, anionic surfactants containing an acid group such a sulfonic acid, sulfuric acid, phosphoric acid, phosphate and carboxylic acid, amphoteric surfactants such as amino sulfonic acid, and natural surfactants such as saponin. The antistatic agent is added normally at 0.01 to 40 parts by weight of the binder.

In the present invention, an electroconductive fine particle can be preferably used as an antistatic agent. Examples of such antistatic agents include antistatic agents prepared by coating metal particles such as those of carbon black, graphic, tin oxide, silver particle, silver oxide, silver nitrate, organic silver compounds and copper particle, and metal oxide pigments such as zinc oxide, barium sulfate and titanium oxide, with tin oxide or with an electroconductive material such as antimony-solid solution tin oxide films. The average particle size of the electroconductive fine particle is normally 5 to 700 nm and preferably 5 to 200 nm. The content of the electroconductive fine particle is normally 1 to 20 parts by weight, preferably 2 to 7 parts by weight to 100 parts by weight of the ferromagnetic and/or non-magnetic particle.

It will be apparent to those skilled in the art that various modifications and variations can be made in the manufacture and practice of the present invention without departing from the scope or spirit of the invention. Other embodiments of the invention will be apparent to those skilled in the art from consideration of the specification and examples should be considered as exemplary only, wit a true scope and spirit of the invention being indicated by the following claims.

What is claimed is:

1. A multi-layer magnetic recording medium comprising a nonmagnetic substrate having provided thereon a magnetic inner layer having a squareness ratio of from 0.10 to 0.65, and a saturation magnetization from $1.0 \times 10^{-4}$ to $1.5 \times 10^{-3}$ gauss-meters, and a magnetic outer layer containing ferromagnetic particles.

2. The magnetic recording medium of claim 1 wherein the ferromagnetic particles in said magnetic outer layer have a coercive force of from 1,700 Oe to 4,000 Oe.

3. The magnetic recording medium of claim 2 wherein said ferromagnetic particles contain Fe, Co, Al and a rare earth element selected from the group consisting of La, Y, Sm, Nd, Pr, and Ce.

4. The magnetic recording medium of claim 1 wherein said magnetic inner layer contains ferromagnetic particles and nonmagnetic particles, and the weight ratio of ferromagnetic to nonmagnetic particles is from 5:95 to 90:10.

5. The magnetic recording medium of claim 4 wherein said ferromagnetic and/or nonmagnetic particles are surface-treated by Al-compounds and/or Si-compounds.

6. The magnetic recording medium of claim 1 wherein said magnetic inner layer has a thickness of 0.1 to 3 $\mu$m, and said magnetic outer layer has a thickness of 0.05 to 1.0 $\mu$m.

7. The magnetic recording medium of claim 1 in which:
   a. the ferromagnetic particles in the magnetic inner layer are acicular ferromagnetic particles having a major axis of not greater than 0.3 $\mu$m and/or spherical ferromagnetic particles having an average particle diameter of from 5 to 150 nm; and
   b. the acicular ferromagnetic particles and/or spherical ferromagnetic particles are selected from soft magnetic metal particles, $\gamma$—$Fe_2O_3$, $Fe_3O_4$, Co-modified $\gamma$—$Fe_2O_3$, Co-modified $Fe_3O_4$, $Fe_2O_4$ wherein X is selected from the group consisting of Mn, Ni, Mg, Zn, and Cu, or mixtures thereof.

8. The magnetic recording medium of claim 1 wherein said ferromagnetic particles in the magnetic outer layer are selected from ferromagnetic iron oxide particles, cobalt-modified ferromagnetic iron oxide particles, chromium dioxide particles, hexagonal ferrite particles, ferromagnetic metal particles, or mixtures thereof.

9. The magnetic recording medium of claim 1 wherein said magnetic outer layer contains hexagonal ferrite particles having a coercive force of from 1,400 Oe to 5,000 Oe.

10. The magnetic recording medium of claim 9 in which:
    a. the medium is transported in a transport direction;
    b. the hexagonal ferrite or ferromagnetic particles in the magnetic outer layer have a major axis defining a major axis direction; and
    c. the hexagonal ferrite or ferromagnetic particles in the magnetic outer layer are oriented such that the major axis direction and transport direction are substantially parallel.

11. The magnetic recording medium of claim 9 in which:
    a. the medium is transported in a transport direction;
    b. the hexagonal ferrite or ferromagnetic particles in the magnetic outer layer have a major axis defining a major axis direction; and
    c. the hexagonal ferrite or ferromagnetic particles in the magnetic outer layer are oriented such that the major axis direction and transport direction are substantially perpendicular.

12. The magnetic recording medium of claim 1 wherein said magnetic inner layer contains particles having a coercive force of from 10 Oe to 300 Oe.

13. The magnetic recording medium of claim 1 wherein said magnetic inner layer contains particles having a coercive force of from 10 Oe to 1,000 Oe.

14. A multi-layer magnetic recording tape comprising a nonmagnetic substrate having provided thereon a magnetic inner layer having a thickness of 0.1 to 3.0 mm, a squareness ratio of from 0.10 to 0.65, and a saturation magnetization of from $1.0 \times 10^{-4}$ to $1.5 \times 10^{-3}$ gauss-meter, and a magnetic outer layer with a thickness of 0.05 to 1.0 $\mu$m containing ferromagnetic particles.

15. The magnetic recording medium of claim 14 wherein the ferromagnetic particles in the magnetic outer layer are ferromagnetic metal particles having a coercive force of from 1,700 Oe to 4,000 Oe and said ferromagnetic metal particles contain Fe, Co, Al, and a rare earth element selected from the group consisting of La, Y, Sm, Nd, Pr and Ce.

16. The magnetic recording medium of claim 15 in which:
    a. the medium is transported in a transport direction;
    b. the hexagonal ferrite or ferromagnetic particles in the magnetic outer layer have a major axis defining a major axis direction; and
    c. the hexagonal ferrite or ferromagnetic particles in the magnetic outer layer are oriented such that the major axis direction and transport direction are substantially parallel.

17. The magnetic recording medium of claim 15 in which:
    a. the medium is transported in a transport direction;
    b. the hexagonal ferrite or ferromagnetic particles in the magnetic outer layer have a major axis defining a major axis direction; and
    c. the hexagonal ferrite or ferromagnetic particles in the magnetic outer layer are oriented such that the major axis direction and transport direction are substantially perpendicular.

18. The magnetic recording medium of claim 14 wherein said magnetic inner layer contains ferromagnetic iron oxide particles and nonmagnetic particles, and the weight ratio of ferromagnetic iron oxide to nonmagnetic particles is 5:95 to 90:10.

19. The magnetic recording medium of claim 18 wherein said ferromagnetic iron oxide and/or nonmagnetic particles are surface-treated by Al-compounds and/or Si-compounds.

20. The magnetic recording medium of claim 14 wherein:
    a. said magnetic inner layer contains ferromagnetic particles which are selected from soft magnetic metal particles, $\gamma$—$Fe_2O_3$, $Fe_3O_4$, Co-modified $\gamma$—$Fe_2O_3$, or Co-modified $Fe_3O_4$, $Fe_2O_4$ wherein X is selected from the group consisting of Mn, Ni, Mg, Zn, and Cu; and
    b. the ferromagnetic particles are
       1) acicular particles having a major axis of no more than 0.30 $\mu$m,
       2) spherical particles having an average particle diameter of from 5 to 150 nm, or
       3) a combination of acicular particles having a major axis of no more than 0.3 $\mu$m and spherical particles having an average particle diameter of from 5 to 150 nm.

21. The magnetic recording medium of claim 14 wherein said ferromagnetic particles in the magnetic outer layer are selected from ferromagnetic iron oxide particles, ferromagnetic cobalt-modified iron oxide particles, chromium dioxide particles, hexagonal ferrite particles, or ferromagnetic metal particles.

22. The magnetic recording medium of claim 14 wherein said uppermost layer contains hexagonal ferrite particles has a coercive force of from 1,400 Oe to 5,000 Oe.

23. The magnetic recording medium of claim 14 wherein said magnetic inner layer contains particles having a coercive force of from 10 Oe to 300 Oe.

24. The magnetic recording medium of claim 14 wherein said magnetic inner layer contains particles having a coercive force of from 10 Oe to 1,000 Oe.

* * * * *